United States Patent [19]

Nishimura et al.

[11] Patent Number: 4,847,688

[45] Date of Patent: Jul. 11, 1989

[54] MOVING BODY RECOGNITION CIRCUIT USING LUMINANCE SIGNAL AND MOVING BODY TRACKING APPARATUS USING THE MOVING BODY RECOGNITION CIRCUIT

[75] Inventors: Shigeru Nishimura, Tokyo; Toshihisa Kuroda, Sagamihara; Koichi Kawata, Tokyo, all of Japan

[73] Assignee: Matsushita Electric Industrial Co., Ltd., Osaka, Japan

[21] Appl. No.: 182,005

[22] Filed: Apr. 15, 1988

[30] Foreign Application Priority Data

Apr. 17, 1987 [JP] Japan .................................. 62-95625
May 29, 1987 [JP] Japan ................................. 62-135255
Jun. 18, 1987 [JP] Japan ................................. 62-151890

[51] Int. Cl.$^4$ ............................................... H04N 7/18
[52] U.S. Cl. .................................... 358/125; 358/126; 358/96
[58] Field of Search ................. 358/96, 125, 126, 107, 358/108

[56] References Cited

U.S. PATENT DOCUMENTS 3,733,434  5/1973  Weinstein ............................ 358/126
4,130,835  12/1978  Guildford ......................... 358/96 X
4,656,594  4/1987  Ledley ............................. 358/96 X

FOREIGN PATENT DOCUMENTS 54-161819  12/1979  Japan .

OTHER PUBLICATIONS

"A Comparison of Image Tracking Techniques Using Correlation" by James Fawcett, 1980 IEEE pp. 892-899.

Primary Examiner—James J. Groody
Assistant Examiner—Victor R. Kostak
Attorney, Agent, or Firm—Pollock, VandeSande & Priddy

[57]  ABSTRACT

In a moving body tracking apparatus having a moving body recognition circuit and TV camera, the moving body recognition circuit includes: a contour signal generator for producing a first contour signal indicative of contour of an image defined by at least one field, a second contour signal subsequent to the first contour signal, and a third contour signal subsequent to the second contour signal, a first and a second memory for temporarily storing, respectively the first and the second contour signals; contour line width increasing circuit responsive to the first and second memory for increasing the width of contour line represented by output signals of the first and second memory; and comparator responsive to the third contour signal and output signal from the contour line width increasing circuit for producing an output signal when a contour line represented by the third contour signal is out of phase with a contour line represented by the output signal from the contour line width increasing circuit. As a result, moving body except for undesired small movement can be satisfactorily extracted.

15 Claims, 6 Drawing Sheets

MOVING BODY RECOGNITION CIRCUIT USING LUMINANCE SIGNAL AND MOVING BODY TRACKING APPARATUS USING THE MOVING BODY RECOGNITION CIRCUIT

BACKGROUND OF THE INVENTION

1. Field of the Invention

This invention relates generally to image recognition techniques using a signal from an imaging apparatus such as a TV camera, and particularly to a moving body recognition circuit using luminance signal and moving body tracking apparatus using the moving body recognition circuit.

2. Prior Art

Heretofore, an imaging apparatus such as a TV camera has been applied to visual applications and monitoring applications in medical fields and robots of industrial field. In these applications, images are merely reproduced and recognized. Recently, in factory automations, robots, and remote monitorings, it is required that a particular moving body be monitored and tracked by controlling the movement of an imaging apparatus. However, in conventional moving body monitoring and tracking apparatus, separation between a moving body and a background cannot automatically be correctly be performed. In addition, tracking of desired moving body is not satisfactorily performed in a conventional system in which a camera is continuously panned and tilted in accordance with the movement of the moving body. This is because even a background imaged with small movements of the camera stand is recognized as moving bodies in the image, and because even small movements in a background are also recognized as moving bodies. More specificially, in the case of an image of a landscape, the movement of leaves by a light wind is also recognized by the tracking apparatus as a moving body. Electric signals caused by such leaf movements are not required, and the signal operates as noise signals in the tracking apparatus. Besides, if there are moving bodies in a particular landscape, one moving body cannot be tracked. More specifically, during tracking of a person moving at a slow speed, if an automobile moving at a speed quicker than the person crosses in such landscape image, the target which is to be tracked is changed from the person to the automobile. Therefore, the person cannot be tracked by using such conventional tracking apparatus.

SUMMARY OF THE INVENTION

The present invention has been developed in order to remove the above-described drawbacks inherent to the conventional moving body recognition apparatus.

It is, therefore, an object of the present invention to provide a new and useful moving body recognition circuit having a function in which a moving body is correctly recognized by having the body automatically separating from the background.

It is another object of the invention to provide a moving body recognition circuit having a function in which undesired small movements are excluded.

It is a further object of the invention to provide a moving body recognition circuit having a function in which moving body can be tracked at a desired speed.

It is a still further object of the invention to provide a moving body tracking apparatus in which a moving body can be correctly tracked by automatically controlling a TV camera.

In accordance with the present invention there is provided a moving body recognition circuit using liminance signal, comprising: contour signal generator means responsive to the luminance signal for producing a first contour signal indicative of the contour of an image defined by at least one field, a second contour signal indicative of the contour of an image defined by at least one field subsequent to the first-mentioned field, and a third contour signal indicative of the contour of an image defined by at least one field subsequent to the second-mentioned field; first memory means for temporarily storing the first contour signal; second memory means for temporarily storing the second contour signal, phase compensator for compensating for the phase of the third contour signal; contour line width increasing means responsive to the first and second memory means for increasing the width of contour line represented by outpout signals of the first and second memory means; and comparator means responsive to output signal from the phase compensator and output signal from the contour line width increasing means for producing an output signal when a contour line represented by the output signal from the phase compensator is out of phase with a contour line represented by the output signal from the contour line width increasing means.

In accordance with the present invention there is also provided a using moving body recognition circuit using luminance signal, comprising: contour signal generator means responsive to the luminance signal for producing a first contour signal indicative of the contour of an image defined by at least one field, a second contour signal indicative of the contour of an image defined by at least one field subsequent to the first-mentioned field, and a third contour signal indicative of the contour of an image defined by at least one field subsequent to the second-mentioned field; first memory means for temporarily storing the first contour signal; second memory means for temporarily storing the second contour signal; phase compensator for compensating for the phase of the third contour signal; OR gate means responsive to the output signal for the first and second memory means; moving body contour separator means responsive to the output signal from the phase compensator and output signal from the OR gate means for producing an output signal when a contour line represented by the output signal from the phase compensator is out of phase with a contour line represented by the output signal from the OR gate means; contour line width increasing means responsive to the output signal from the OR gate means for increasing the width of contour line represented by output signals of the first and second memory means; and comparator means responsive to output signal from the moving body contour separator means and output signal from the contour line width increasing means for producing output signal when a contour line represented by the output signal from the moving body contour separator means is out of phase with a contour line represented by the output signal from the contour line width increasing means.

In accordance with the present invention there is further provided a moving body recognition circuit using a liminance signal, comprising: contour signal generator means responsive to the liminance signal for producing a first contour signal indicative of the contour of an image defined by at least one field, a second contour signal indicative of the contour of an image defined by at least one field, and a third contour signal indicative of the contour of an image defined by at least one field; memory means for temporarily storing, respectively, the first and second contour signals; moving body contour separating means responsive to the third contour signal and output signal from the memory means for producing an output signal representing moving a body contour signal; pulse generator means responsive to a field period signal for producing a plurality of sampling signals and a plurality of camera stand driving signals; switching means for selecting one signal in the sampling signals, such selected one signal being applied to the memory means to sample the first and second contour signals, and for selecting one signal in the camera stand driving signals; and camera stand controller means responsive to the moving body contour signal and one of the camera stand driving signals for producing an output signal representing camera stand control signal.

In accordance with the present invention there is further provided a moving body recognition circuit using a liminance signal, comprising: contour signal generator means responsive to the luminance signal for producing a first contour signal indicative of the contour of an image defined by at least one field, a second contour signal indicative of the contour of an image defined by at least one field, and a third contour signal indicative of the contour of an image defined by at least one field; sampling pulse generator means for producing a first sampling signal and a second sampling signal; a first moving body extractor means including: a first memory means for temporarily storing, respectively, the first and second contour signals in accordance with the first sampling signal; a first phase compensator compensating for the phase of the third contour signal; a first moving body contour separator means responsive to the output signal from the first phase compensator and output signal from the first memory means for producing an output signal when a contour line represented by the output signal from the first phase compensator is out of phase with a contour line represented by the output signal from the first memory means; a first contour line width increasing means responsive to the output signal from the first memory means for increasing the width of contour line represented by output signals from the first memory means; and a first comparator means responsive to output signal from the first moving body contour separator means and output signal from the first contour line width increasing means for producing output signal when a contour line represented by the output signal from the first moving body contour separator means is out of phase with a contour line represented by the output signal from the first contour line width increasing means; a second moving body extractor means including: a second memory means for temporarily, storing respectively, the first and second contour signals in accordance with the second sampling signal; a second phase compensator for compensating the phase of the third contour signal; a second moving body contour separator means responsive to the output signal from the second phase compensator and output signal from the second memory means for producing an output signal when a contour line represented by the output signal from the second phase compensator is out of a contour line represented by the output signal from the second memory means; a second contour line width increasing means responsive to the output signal from the second memory means for increasing the width of contour line represented by output signals from the second memory means; and a second comparator means responsive to output signal from the second moving body contour separator means and output signal from the second contour line width increasing means for producing an output signal when a contour line represented by the output signal from the second moving body contour separator means is out of phase with a contour line represented by the output signal from the second contour line width increasing means; a first position control signal generator means responsive to output signal from the first moving body extractor means for calculating a moving body centroid in accordance with the output signal from the first moving body extractor means and for producing output signals representing a first horizontal position control signal and a first vertical position control signal; and a second position control signal generator means responsive to output signal from the second moving body extractor means for calculating a moving body centroid in accordance with the output signal from the second moving body extractor means and for producing output signals representing a second horizontal position control signal and a second vertical position control signal.

In accordance with the present invention there is still further provided a moving body tracking apparatus comprising: a TV camera for producing a TV signal having a luminance signal to image a moving body; a TV monitor for monitoring images of the moving body; a moving body recognition circuit using the liminance signal comprising: contour signal generator means responsive to the luminance signal for producing a first contour signal indicative of the contour of an image defined by at least one field, a second contour signal indicative of the contour of an image defined by at least one field, and a third contour signal indicative of the contour of an image defined by at least one field; sampling pulse generator means for producing a first sampling signal and a second sampling signal; a first moving body extractor means including: a first memory means for temporarily storing, respectively, the first and second contour signals in accordance with the first sampling signal; a first phase compensator for compensating for the phase of the third contour signal; a first moving body contour separator means responsive to the output signal from the first phase compensator and output signal from the first memory means for producing an output signal when a contour line represented by the output signal from the first phase compensator is out of phase with a contour line represented by the output signal from the first memory means; a first contour line width increasing means responsive to the output signal from the first memory means for increasing the width of the contour line represented by output signals from the first memory means; and a first comparator means responsive to the output signal from the first moving body contour separator means and output signal from the first contour line width increasing means for producing output signal when a contour line represented by the output signal from the first moving body contour separator means is out of phase with a contour line represented by the output signal from the first contour line width increasing means; a second moving body extractor means including: a second memory means for temporarily storing, respectively, the first and second contour signals in accordance with the second sampling signal; a second phase compensator for compensating for the phase of the third contour signal; a second moving body contour separator means responsive to the output signal from the second phase compensator and output signal from the second memory means for producing an output signal when a contour line represented by the output signal from the second phase compensator is out of phase with a contour line represented by the output signal from the second memory means; a second contour line width increasing means responsive to the output signal from the second memory means for increasing the width of the contour line represented by output signals from the second memory means; and a second comparator means responsive to output signal from the second moving body contour separator means and output signal from the second contour line width increasing means for producing output signal when a contour line represented by the output signal from the second moving body contour separator means is out of phase with a contour line represented by the output signal from the second contour line width increasing means; a first position control signal generator means responsive to an output signal from the first moving body extractor means for calculating a moving body centroid in accordance with the output signal from the first moving body extractor means and for producing output signals representing a first horizontal position control signal and a first vertical position control signal; and a second position control signal generator means responsive to output signal from the second moving body extractor means for calculating a moving body centroid in accordance with the output signal from the second moving body extractor means and for producing output signals representing a second horizontal position control signal and a second vertical position control signal; motor controller means responsive to the first and second horizontal position control signals and the first and second vertical position control signals for producing a horizontal motor control signal and a vertical motor control signal; and stand controller responsive to the horizontal motor control signal and the vertical motor control signal for controlling a movement of the TV camera.

BRIEF DESCRIPTION OF THE DRAWINGS

The objects and features of the present invention will become readily apparent from the following detailed description of the preferred embodiments taken in conjunction with the accompanying drawings in which.

The same or corresponding elements and parts are designated with like reference numerals throughout the drawings.

DETAILED DESCRIPTION OF THE INVENTION

Figure 1:
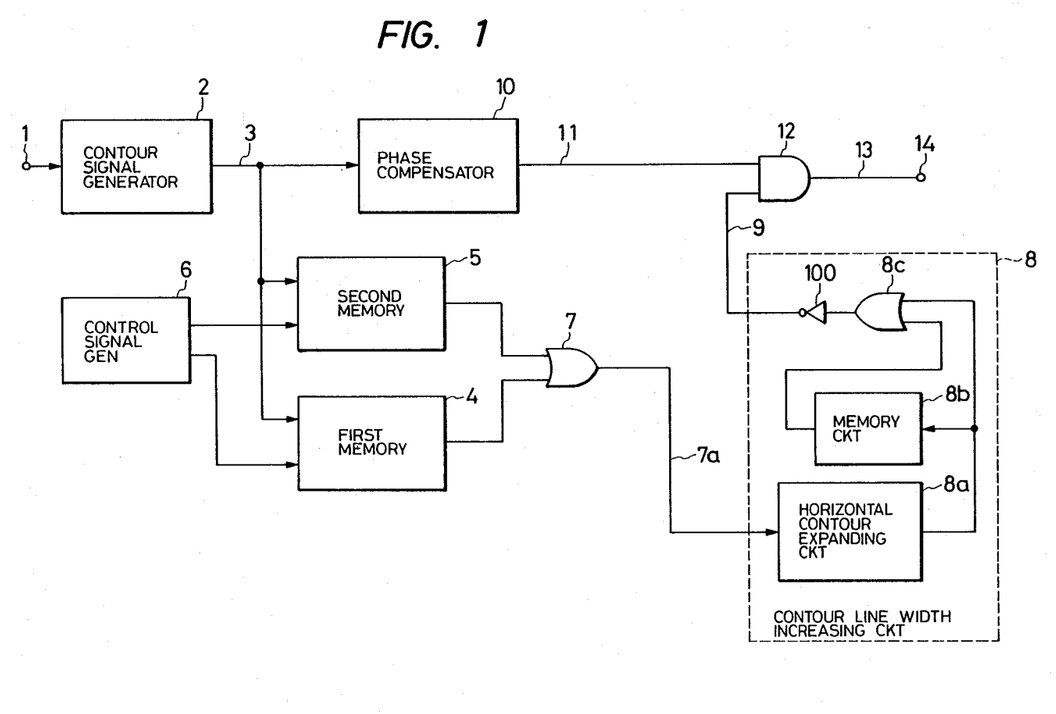
FIG. 1 is a block diagram of a moving body recognition circuit according to a first embodiment of the present invention.

FIG. 1 is a block diagram of a moving body recognition circuit according to a first embodiment of the present invention. The moving body recognition circuit generally comprises a contour signal generator 2, a first memory 4, a second memory 5, a phase compensator 10, an OR gate 7, a contour line width increasing circuit 8, and an AND gate 12 as a comparator. Luminance signal inputted in an input terminal 1 is fed to the first memory 4. In the contour signal generator 2, image control signal 3 formed of contour signals each indicative of the contour of an image defined by at least one field is produced at real time. In this embodiment, it is assumed that each contour signal is defined by one field. A first field contour signal in the image contour signal 3 is fed to the first memory 4, and is temporarily stored therein. A second field contour signal subsequent to the first field contour signal in the image contour signal 3 is fed to the second memory 5, and is temporarily stored therein. A third field contour signal subsequent to the second field contour signal in the contour signal 3 is fed to the phase compensator 10 for compensating for the phase of the third field contour signal by delaying the third field contour signal, and then such a compensated field contour signal 11 is outputted to the AND gate 12. The output signals from the first and second memories are fed to the OR gate 7 for producing a combined signal 7a. The write and read timings of the first and second memories are controlled by the control signal generator 6 such that the above-mentioned operations are preformed. Then, the combined signal 7a is fed to the contour line width increasing circuit 8 having a horizontal contour expanding circuit 8a, a memory circuit 8b, and an OR gate 8c.

In the contour line width increasing circuit 8, the width of each contour of an image defined by the combined signal 7a is increased by way of the following method, for example. The combined signal 7a is fed to the horizontal contour expanding circuit 8a for expanding each contour pulse in one horizontal line signal in the combined signal 7a. Assuming that the one horizontal line signal is formed of 256 dots, in the horizontal contour expanding circuit 8a, pulse width of the each contour pulse is increased by 4 dots. The number of dots corresponding to the pulse width which is to be increased is required to determine a tolerance of small movements in the background. Therefore, the number of dots is freely determined in designing the horizontal contour expanding circuit 8a.

Then such a first increased line signal is fed to the memory circuit 8b by a horizontal sync timing, and is temporarily stored therein. At the same time, the first increased line signal is also fed to the OR gate 8c, and fed to the AND gate 12 via the inverter 100. Subsequently, a second increased signal subsequent to the first increased line signal is fed to the OR gate 8c and the memory circuit 8b by the horizontal sync timing. At the same time, the first increased line signal in the memory circuit 8b is fed to the OR gate 8c. These signals from the horizontal contour expanding circuit 8a and the memory circuit 8b are gated in the OR gate 8c by the horizontal sync signal to be combined with each other. In the memory circuit 8b and the OR gate 8c, the number of horizontal lines is increased by 2 horizontal lines. At this time, the number of lines which is to be increased is also freely determined by controlling the reading out of the output line signal from the memory circuit 8b. Meanwhile, the horizontal contour expanding circuit 8a and the memory circuit 8b are operated by a control signal from a sync generator (not shown).

Output signal 9 from OR gate 8c is fed, via an inverter 100, to the AND gate 12 for producing an output signal 13 when a contour line represented by the compensated field contour signal 11 is out of phase with a corresponding contour line represented by the output signal 9. It is to be noted that the phase is determined such that the contour line represented by the output signal 11 is centered in the contour line represented by the increased contour line signal 9. In this embodiment, if a contour line derived from an image moves by 3 or more dots in the horizontal direction and by 2 or more dots in the vertical direction, the contour line of the moving body of the image is extracted by the AND gate 12, and is obtained from a terminal 14. Therefore, each static contour line in the background is not outputted from the AND gate even when the background has a small movement such as a leaf movement by a light wind.

As described above, a moving body can be correctly extracted from a corresponding background by the above-mentioned simple circuit arrangement and the above-mentioned simple operational processes without any particular extracting and calculating circuit thereof.

Figure 2:
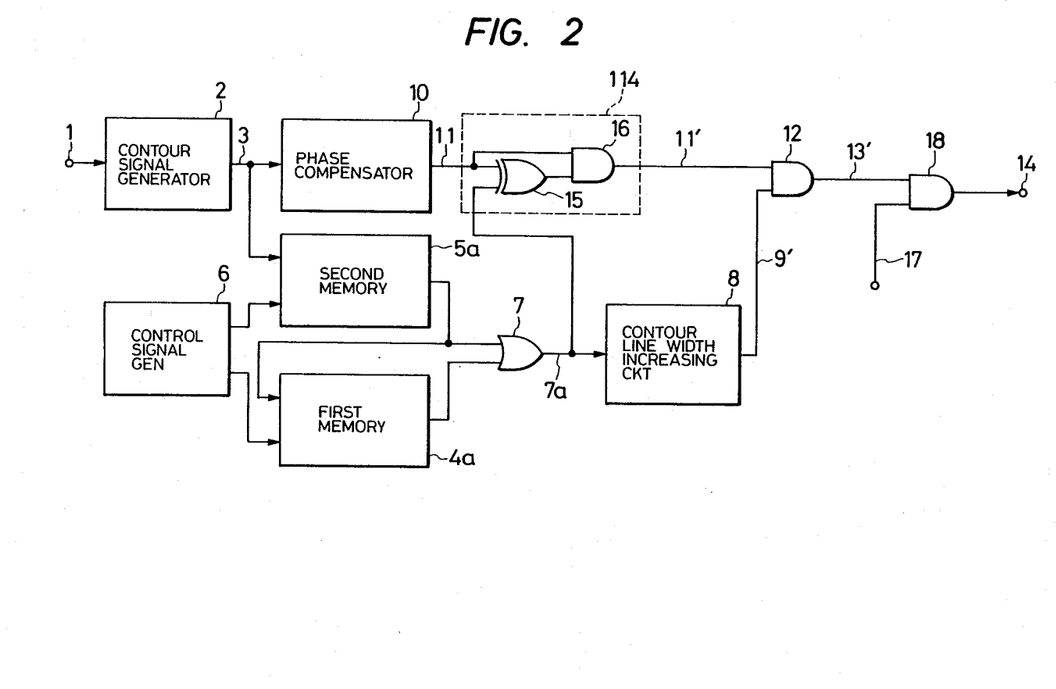
FIG. 2 is a block diagram of a moving body recognition circuit according to a second embodiment of the present invention.

FIG. 2 is a block diagram of a moving body recognition circuit according to a second embodiment of the present invention. The structure of the circuit arrangement in the second embodiment is the same as that of the first embodiment except for the following points. A first memory 4a and a second memory 5a are connected to each other in series, and a moving body contour separator 114 is connected between phase compensator 10 AND gate 12. The first and second memories 4a and 5a generally operate as the first and second memories 4 and 5 in the first embodiment. The output signals from the first and second memories 4a and 5a are gated in OR gate 7 for producing combined signal 7a which is also fed to the moving body contour separator 114. The moving body contour separator 114 generally comprises an XOR gate 15 responsive to an output signal 11 from phase compensator 10 and the output signal 7a from the OR gate 7 and an AND gate 16 responsive to the output signal from the XOR gate 15 and the output signal 11 from the phase compensator 10. In the moving body contour separator 114, an output signal 11' therefrom is produced when the contour line represented by the output signal 11 from the phase compensator 10 is out of phase with a contour line represented by the output signal 7a from the OR gate 7. More specifically, in the moving body contour separator 114, only the contour signal 11' of a moving body is separated from a corresponding background. Such a moving body contour signal 11' is fed to AND gate 12 to be compared with an increased contour signal 9' from contour line width increasing circuit 8. In the AND gate 12, an output signal 13' is produced when a contour line represented by the output signal 11' from the moving body contour separator 114 is out of phase with a contour line represented by the output signal 9' from the contour line width increasing circuit 8. It is to be noted that the AND gate 12 outputs only the moving body contour signal 13'. In addition, an output timing control gate 18 operates so as not to output the moving body contour signal 13' during blanking pulses from sync signal generator (not shown).

As will be seen from above, since only a moving body contour signal is previously separated from the background in the moving body contour separator 114, the precision of moving body extraction in the AND gate 12a can be increased in the second embodiment. Besides, when it is required that the small movement contour signal is extracted, the contour line increasing circuit 8 and the AND gate 12 are not used, and the output signal 11' from the moving body contour separator 114 is directly inputted in the output timing controller 18. In addition, in the above-mentioned embodiments, moving body tracking can be achieved by controlling a TV camera stand using a camera stand control signal on the basis of the output signal 13 from the AND gate 12.

Figure 3:
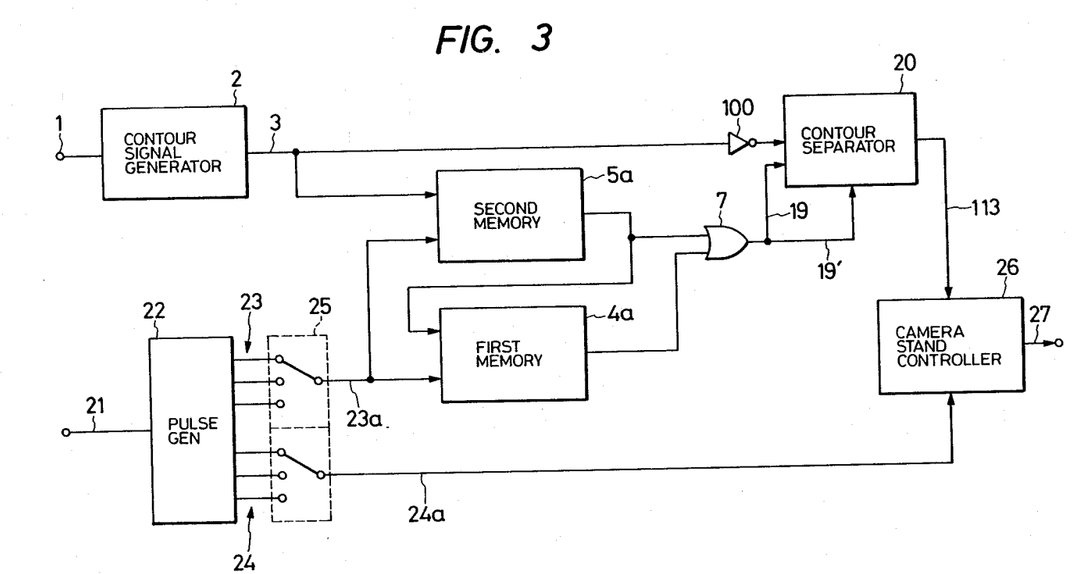
FIG. 3 is a block diagram of a moving body recognition circuit according to a third embodiment of the present invention.

FIG. 3 is a block diagram of a moving body recognition circuit according to a third embodiment of the present invention. The structure of the circuit arrangement in the third embodiment is similar to the above-mentioned first and second embodiments. In the third embodiment, the moving body recognition circuit generally comprises contour signal generator 2, first memory 4a, second memory 5a, OR gate 7, a contour separator 20, a camera stand controller 26, a pulse generator 22, a switching circuit 25, and a camera stand controller 26. The operations of the contour signal generator 2, the first memory 4a, the second memory 5a, and the OR gate 7 are generally equal to the first and second embodiments. The contour separator 20 can have and body contour separator 114 and AND gate 12, or just the AND gat 12. Therefore, when the contour separator 20 is formed of only the AND gate 12, an output signal 19' from the OR gate 7 is not required. Besides, since the third embodiment has no contour line width increasing means such as the contour line width increasing circuit 8, an output signal 19 from the OR gate 7 is directly fed to the contour separator 20 for producing a moving body contour signal. When it is required that the small movement signal is excluded from images thereof, the contour line width increasing means is provided between the OR gate 7 and the contour separator 20a as in the above-mentioned first and second embodiments. In addition, either the third contour signal from the contour signal generator 2 or the output signal 19 from the OR gate 7 must be inverted by an inverter 100.

The pulse generator 22 produces a plurality of sampling pulses 23 to sample the first and second contour signals from the contour signal generator 2 and a plurality of camera stand driving pulses 24 from field period timing signal 21 inputted in the pulse generator 22. Each of the sampling pulses 23 is a signal having a different sampling speed from others, and each of the camera stand driving pulses 24 is a signal representing a different driving speed from others. One signal 23a in the sampling signals 23 is selected in the switching circuit 25 for controlling the read and write timings of the first and second memories 4a and 5a. Similarly, one signal 24a in the camera stand driving signals 24 is selected by the switching circuit 25, and fed to the camera stand controller 26. Meanwhile, moving body contour signal 113 from the contour separator 20 is also fed to the camera stand controller 26. The camera stand controller 26 produces a camera stand control signal 27 for controlling the stepping motor in a camera stand (not shown).

Figure 4A:
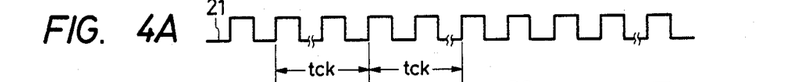
FIG. 4A is a waveform chart of a field period timing signal 21 in FIG. 3.
Figure 4B:
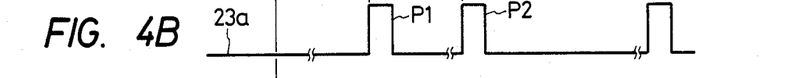
FIG. 4B is a waveform chart of a sampling pulse 23a in FIG. 3.
Figure 4C:
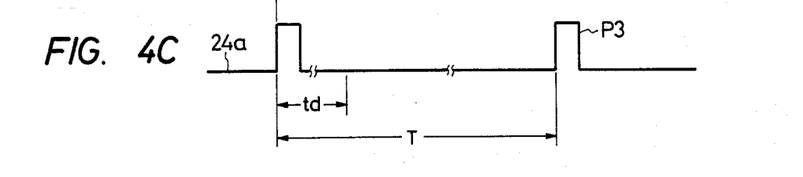
FIG. 4C is a waveform chart of a camera stand driving pulse 24a in FIG. 3.

FIG. 4A is a waveform chart of a field period timing signal 21 in FIG. 3. FIG. 4B is a waveform chart of a sampling pulse 23a in FIG. 3, and FIG. 4C is a waveform chart of a camera stand driving pulse 24a in FIG. 3. The operation of the third embodiment will be described hereinbelow. First, an outputted image signal from a TV camera in the camera stand is converted into image contour signal 3 in the contour signal generator 2. A first contour signal in the image contour signal 3 is simultaneously stored in the second memory 5a during the time of a pulse P1 in the sampling pulse 23a shown in FIG. 4B. Second, a second contour signal in the image contour signal 3 is simultaneously stored in the second memory 5a during the time of a pulse P2 in the sampling pulse 23a. At the same time, such stored first contour signal in the second memory 5a is fed to the first memory 4a for being simultaneously stored therein. Next, the stored first contour signal in the first memory 4a and the stored second contour signal in the second memory 5a are read out by the field timing signal 21 shown in FIG. 4A, and are gated in the OR gate 7 for producing the combining signal 19.

More specifically, the period of the sampling pulse 23a is tck as shown in FIG. 4B, and is determined by a view angle $\theta$ of the camera, a rotational speed of the camera stand, etc. The first contour signal stored in the second memory 5a at the time period of the pulse P1 is outputted to the OR gate 7 from the first memory 4a after the pulse P2. The second contour signal stored in the second memory 5a at the time period of the pulse P2 is outputted to the OR gate 7 from the second memory 5a. These outputted signals from the first and second memories 4a and 5a are gated in the OR gate 7 by the positive time of the field period signal 21 after the pulse P2. In the contour separator 20, the moving body contour signal 113 is produced by each of such gated signals 19 and the third contour signal fed at real time from the contour signal generator 2. The above-mentioned operation is sequentially executed until a rise of a pulse P3 shown in FIG. 4C. Then, one moving body contour signal 113 is produced just before the pulse P3 is fed to the camera stand controller 26. In the camera stand controller 26, a position of the moving body is determined by the moving body contour signal 113, and the camera stand control signal 27 is produced for applying to the camera stand in accordance with the camera stand driving signal 24a. As shown in FIG. 4C, the above-described operation is executed by one tracking cycle during T, and a reference numeral td shows a time period for calculation of camera stand moving amount and for actual motion. In this embodiment, the tracking cycle duration T is approximately three times longer than the sampling period tck.

As will be understood from the above description, since a plurality of sampling pulses 23 are produced and desired sampling time signals 23a can be selected by the switching circuit 25, when tracking moving bodies each having a different moving speed, a target moving body can be satisfactorily tracked by selecting a sampling time corresponding to the speed of the target moving body.

Figure 5:
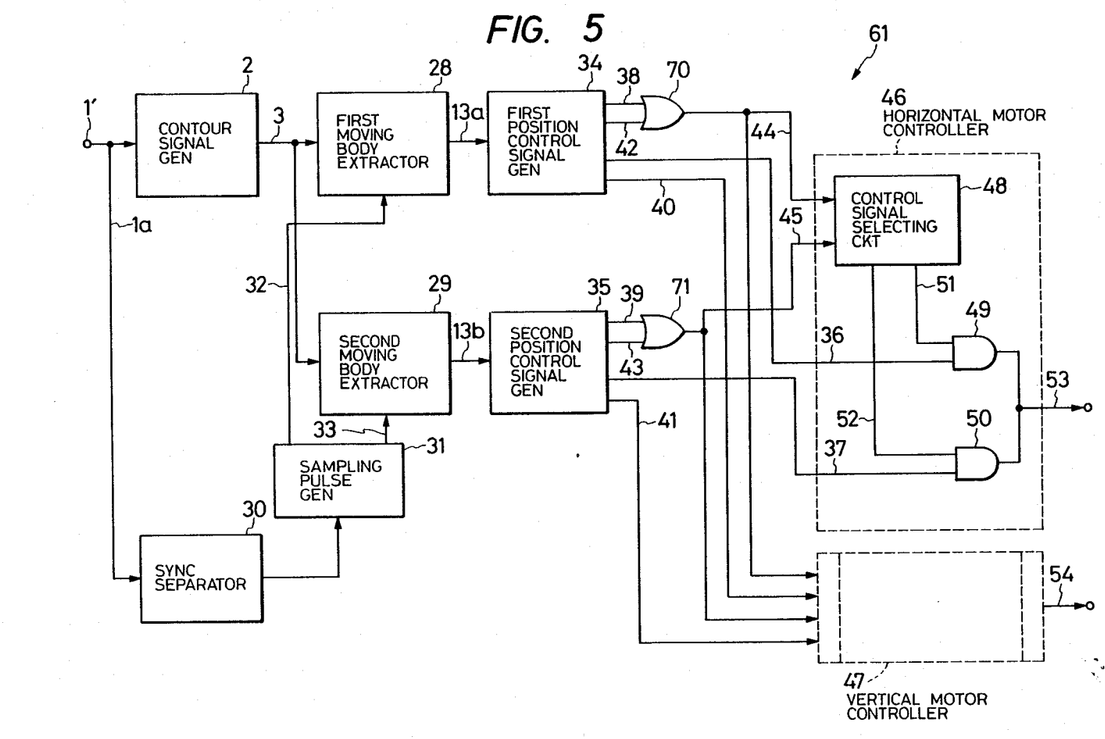
FIG. 5 is a block diagram of a moving body recognition circuit according to a fourth embodiment of the present invention.

FIG. 5 is a block diagram of a moving body recognition circuit 61 according to a fourth embodiment of the present invention. In the forth embodiment, the moving body recognition circuit 61 generally comprises contour signal generator 2, a sync separator 30, a sampling pulse generator 31, a first moving body extractor 28, a second moving body extractor 29, a first position control signal generator 34, a second position control signal generator 35, a horizontal motor controller, and a vertical motor controller. The first moving body extractor 28 and the second moving body extractor 29 respectively include: first and second memories 4 and 5, OR gate 7, contour line width increasing circuit 8, phase compensator 10, and AND gate 12 used in the first embodiment with the same structure thereof; first and second memories 4a and 5a, OR gate 7, AND gate 12, contour line width increasing circuit 8, moving body contour separator 114, and phase compensator 10 used in the second embodiment with the same structure thereof; or first and second memories 4a and 5a, OR gate 7, and contour separator 20 used in the third embodiment with the same structure thereof. Therefore, the description of the operation of the first moving body extractor 28 and second moving body extractor 29 is omitted.

The first position control signal generator 34 and the second position control signal generator 35 respectively show a circuit arrangement for calculating the centroid of a target moving body and for respectively producing horizontal positioning signals and vertical positioning signals in tracking operation. One example of such circuit arrangement is shown in Japanese Laid-Open Patent Application No. 54-161819. The horizontal motor controller 46 generally comprises a control signal selecting circuit 48 (shown in FIG. 6), and a first and a second AND gates 49 and 50 for controlling an output timing of horizontal position control signal. The vertical motor controller 47 has the same structure as the horizontal motor controller 46. The control signal selecting circuit 48 includes a switching circuit 55, a pulse width determining circuit 56, an inverter 57 and an AND gate 58.

FIGS. 7A–7H are waveform charts for better understanding of the operation in the fourth embodiment.

Figure 7A:
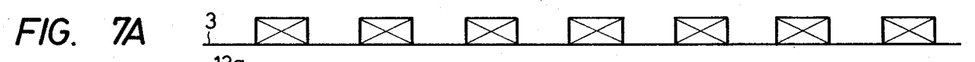
FIGS. 7A–7H are signal waveform charts.
Figure 7B:
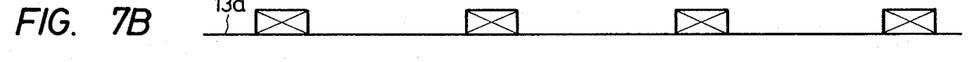
Figure 7C:
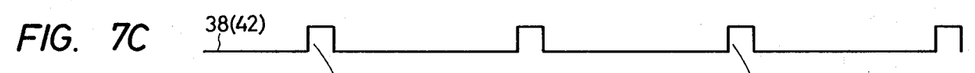
Figure 7D:
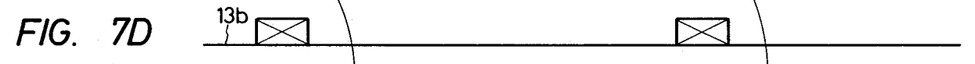
Figure 7E:
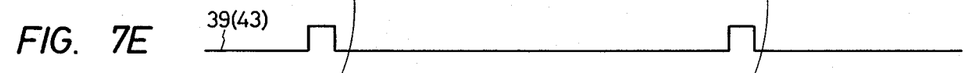
Figure 7F:
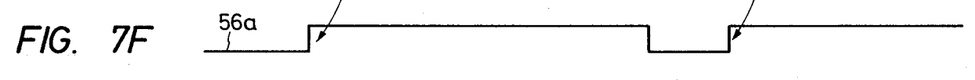
Figures 7G, 7H:
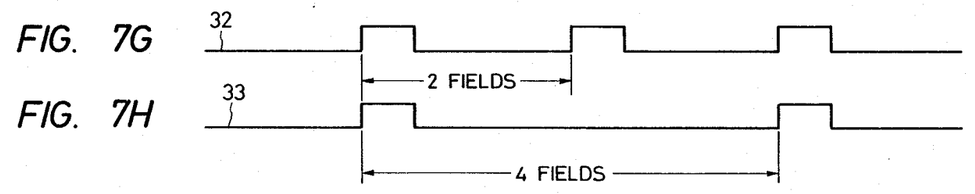

With reference to FIG. 5 and FIGS. 7A–7H, the operation of the fourth embodiment will be described hereinbelow. Inputted TV signal 1a having sync signal and luminance signal in a terminal 1' is fed to the contour signal generator 2 and the sync separator 30 for separating the sync signal from the TV signal 1a. In the sampling pulse generator 31, a sampling pulse signal 32 having a two-fields period and a sampling pulse signal 33 having a four-fields period are produced as shown in FIG. 7G and FIG. 7H. These sampling pulse signals 32 and 33 each indicating a different sampling time are produced in accordance with the sync signal outputted from the sync separator 30, and respectively fed to the first moving body extractor 28 and the second moving body extractor 29. It means that two moving bodies each moving at a different speed can be respectively tracked. More specifically, the contour signals which represent two moving bodies and which are to be memorized in memory means in the first moving body extractor 28 and the second moving body extractor 29 are respectively sampled by the sampling pulse signals 32 and 33. Meanwhile, contour signal 3 (see also FIG. 7A) produced by the contour signal generator 2 is fed to the first moving body extractor 28 and the second moving body extractor 29 at real time, and moving body contour signals 13a having a two-fields period and 13b having a four-fields period (see also FIGS. 7B and 7D) are respectively outputted from the first and second moving body extractors 28 and 29 to the respective first and second position control signal generators 34 and 35. In this case, assume that a quick speed moving body corresponds to the moving body contour signal 13a, and that a slow speed moving body corresponds to the moving body contour signal 13b.

In the first position control signal generator 34, the moving body centroid is calculated using the moving body contour signal 13a, and a deviation between the centroid position and the center of a display is also calculated with respect to a horizontal axis (X-axis) and a vertical axis (Y-axis) of the image. Then, horizontal position control signal 36 and vertical position control signal 40 are produced using such calculated results. While the horizontal position control signal 36 is active, gates pulse signal 38 is outputted to on OR gate 70 (see also FIG. 7C). While the vertical position control signal 40 is active, gate pulse signal 42 is outputted to the OR gate 70. Thus, when either the gate pulse signal 38 or the gate pulse signal 42 is active, such active signal 44 is outputted to the horizontal motor controller 46 and the vertical motor controller 47. In the second position control signal generator 35, the moving body centroid is calculated using the moving body contour signal 13b, and a deviation between the centroid position and the center of a display is also calculated with respect to a horizontal axis and a vertical axis of the image. Then, vertical position control signal 37 and vertical position control signal 41 are produced using such calculated results. While the horizontal position control signal 37 is active, gate pulse signal 39 is outputted to an OR gate 71 (see also FIG. 7E). While the vertical position control signal 41 is active, gate pulse signal 43 is outputted to the OR gate 71. Thus, when either the gate pulse signal 39 or the gate pulse signal 43 is active, such active signal 45 is outputted to the horizontal motor controller 46 and the vertical motor controller 47.

Figure 6:
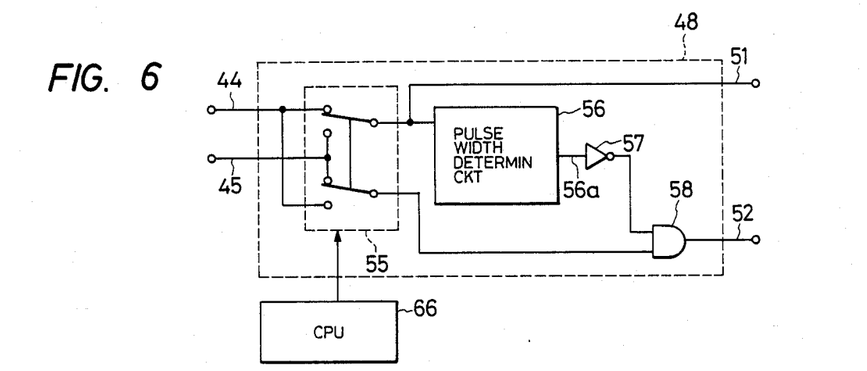
FIG. 6 is a block diagram showing a control signal selecting circuit in the moving body recognition circuit according to the fourth embodiment.

In the horizontal motor controller 46, one of the horizontal position control signals 36 and 37 is selected, and outputted as a horizontal motor control signal 53 for controlling the panning movement of the camera. In the vertical motor controller 47, one of the vertical position control signals 40 and 41 is selected, and outputted as a vertical motor control signal 54 for controlling the tilting movement of the camera. The selection of the horizontal position control signals 36 and 37 is determined by using the active signals 44 and 45. FIG. 6 is one example of a block diagram showing a control signal selecting circuit 48 in the horizontal motor controller 46 and the vertical motor controller 47. In the state of the switching circuit 55 shown in FIG. 6, priority gate pulse signal is the active signal 44. More specifically, when the active signal 44 is HI, an output signal 51 of the control signal selecting circuit 48 is the inputted active signal 44. As to another output signal 52, the inputted active signal 44 changes LOW by the inverter 57 thereby outputting a signal 56a (see also FIG. 7F), and therefore, the output signal 52 is LOW. On the contrary, when the active signal 44 is LOW, the output signal 51 is the inputted active signal 44. As to the output signal 52, the inputted active signal 44 changes HI by the inverter 57. At this time, if the active signal 45 is HI, the output signal 52 is outputted from the AND gate 58. Thus, when tracking a quick speed moving body, it is required that the active signal 44 is prior to the active signal 45 in the above-mentioned selecting operation in the control signal selecting circuit 48. In FIG. 6, the pulse width determining circuit 56 operates such that the pulse width of the active signal 45 is involved in the pulse width of the active signal 44.

Meanwhile, the horizontal position control signal 36 and the selecting signal 51 outputted from the control signal selecting circuit 48 are applied to the first AND gate 49, and the horizontal position control signal 37 and the selecting signal 52 outputted from the control signal selecting circuit 48 are applied to the second AND gate 50. Therefore, the quick moving body is tracked if the active signal 44 is prior to the active signal 45, and the slow moving body is tracked if the active signal 45 is prior to the active signal 44 in the selecting operation. Besides, if the switching circuit 55 is controlled by a central processing unit (CPU), the switching step is freely determine in the designing of the moving body recognition circuit 61.

Figure 8:
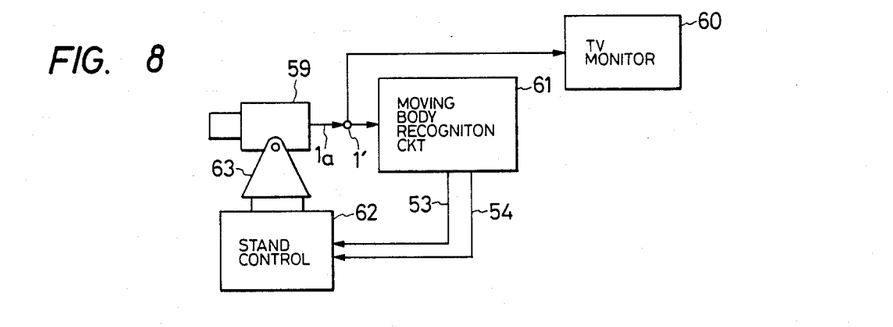
FIG. 8 is a block diagram of a moving body tracking apparatus according to the present invention.

FIG. 8 is a block diagram of a moving body tracking apparatus according to the present invention. In FIG. 8, the moving body tracking apparatus comprises a TV camera 59 for producing TV signal 1a having sync signal and luminance signal to image a moving body, a TV monitor 60 for monitoring the image of the moving body by the TV camera 59, a moving body recognition circuit 61, a camera stand 63, and a stand controller 62 having a horizontal stepping motor and a vertical stepping motor (not shown). In the stand controller 62, the stepping motors are controlled by the horizontal motor control signal 53 and the vertical motor control signal 54 thereby panning and tilting the TV camera 59 via the camera stand 63. In the moving body recognition circuit 61, the liminance signal in the TV signal 1a is inputted in terminal 1, and the horizontal and vertical motor control signals are outputted. The structure and operation of the moving body recognition circuit 61 are omitted here because the moving body recognition circuit 61 is described above with reference to FIG. 5 as the fourth embodiment of the present invention.

As will be seen from the above description, a target moving body is recognized and extracted by the moving speed thereof, and the moving body centroid is calculated for generating the horizontal and vertical motor control signals 53 and 54. In the present invention, the desired tracking speed can be predetermined with priority of the tracking speed, and a target moving body can be satisfactorily tracked by panning and tilting the TV camera 59 even when a plurality of moving bodies each having different speed are imaged at the same time. Besides, the target moving body can be satisfactorily tracked even if there are small movements in background and camera stand movements, and small camera movement caused by undesired panning and tilting can be reduced.

The above-described embodiments are just examples of the present invention, and therefore, it will be apparent to those skilled in the art that many modifications and variations may be made without departing from the scope of the present invention.

What is claimed is:

1. Moving body recognition circuit using a luminance signal, comprising:
   (a) contour signal generator means responsive to said luminance signal for producing a first contour signal indicative of the contour of an image defined by at least one field, a second contour signal indicative of the contour of an image defined by at least one field subsequent to said first-mentioned field, and a third contour signal indicative of the contour of an image defined by at least one field subsequent to said second-mentioned field;
(b) first memory means for temporarily storing said first contour signal;
(c) second memory means for temporarily storing said second contour signal;
(d) a phase compensator for compensating the phase of said third contour signal;
(e) contour line width increasing means responsive to said first and second memory means for increasing the width of a contour line represented by the output signal of said first and second memory means; and
(f) comparator means responsive to an output signal from said phase compensator and an output signal from said contour line width increasing means for producing an output signal when a contour line represented by said output signal from said phase compensator is out of phase with a contour line represented by said output signal from said contour line width increasing means.

2. Moving body recognition circuit as claimed in claim 1, wherein said contour line width increasing means comprises:
(a) horizontal contour expanding means for expanding in a horizontal line contours represented by said output signals from said first and second memory mean;
(b) a memory circuit for temporarily storing a first output signal from said horizontal contour expanding means; and
(c) means for combining an output signal from said memory circuit and second output signal from said horizontal contour expanding means subsequent to said first output signal.

3. Moving body recognition circuit as claimed in Claim 1, wherein said comparator means includes an AND gate.

4. Moving body recognition circuit as claimed in claim 1, further comprising:
a control signal generator for producing timing signals to control read and write timings of said first and second memory means.

5. Moving body recognition circuit using a luminance signal, comprising:
(a) contour signal generator means responsive to said luminance signal for producing a first contour signal indicative of the contour of an image defined by at least one field, a second contour signal indicative of the contour of an image defined by at least one field subsequent to said first-mentioned field, and a third contour signal indicative of the contour of an image defined by at least one field subsequent to said second-mentioned field;
(b) first memory means for temporarily storing said first contour signal;
(c) second memory means for temporarily storing said second contour signal;
(d) a phase compensator for compensating the phase of said third contour signal;
(e) OR gates means responsive to said output signal from said first and second memory means;
(f) moving body contour separator means responsive to said output signal from said phase compensator and an output signal from said OR gate means for producing an output signal when a contour line represented by said output signal from said phase compensator is out of phase with a contour line represented by said output signal from said OR gate means;
(g) contour line width increasing the means responsive to said output signal from said OR gate means for increasing the width of the contour line represented by output signals of said first an second memory means; and
(h) comparator means responsive to an output signal from said moving body contour separate means and an output signal from said contour line width increasing means for producing an output signal when a contour line represented by said output signal from said moving body contour separator mans is out of phase with a contour line represented by said output signal from said contour line width increasing means.

6. Moving body recognition circuit as claimed in claim 5, wherein said contour line width increasing means comprises:
(a) horizontal contour expanding means for expanding in a horizontal line contours represented by said output signals from said OR gate means;
(b) a memory circuit for temporarily storing a first output signal from said horizontal contour expanding means; and
(c) means for combining an output signal from said memory circuit and a second output signal from said horizontal contour expanding means subsequent to said first output signal.

7. Moving body recognition circuit as claimed in claim 5, wherein said moving body contour separator means includes:
XOR gate means responsive to said output signal from said OR gate means and said output signal from said phase compensator; and
AND gate means responsive to said output signal from said XOR gate means and said output signal from said phase compensator.

8. Moving body recognition circuit as claimed in claim 5, wherein said memory means includes:
a first and second memory means for temporarily storing, respectively, said first and second contour signals; and
OR gate means responsive to said output signal from said first and second memory means.

9. Moving body recognition circuit as claimed in claim 5, where said moving body contour separator means includes:
XOR gate means responsive to said output signal from said memory means and said output signal from said third contour signal;
a first AND gate means responsive to an output signal from said XOR gate means and said third contour signal; and
a second AND gate means responsive to an output signal from said first AND gate means and said output signal from said memory means.

10. Moving body recognition circuit using a luminance signal, comprising:
(a) contour signal generator means responsive to said luminance signal for producing a first contour signal indicative of the contour of an image defined by at least one field, a second contour signal indicative of the contour of an image defined by at least one field, and a third contour signal indicative of the contour of an image defined by at least one field;
(b) memory means for temporarily storing, respectively, said first an second contour signals;

(c) moving body contour separating means responsive to said third contour signal and an output signal from said memory means for producing an output signal representing moving body contour signals;

(d) pulse generator means responsive to field period signals for producing a plurality of sampling signals and a plurality of camera stand driving signals;

(e) switching means for selecting one signal in said sampling signals, such selected one signal being applied to said memory means to sample said first and second contour signals, and for selecting one signal in said camera stand driving signals; and (f) camera stand controller means responsive to said moving body contour signal and one of said camera stand driving signal for producing an output signal representing a camera stand control signal.

11. Moving body recognition circuit using a luminance signal, comprising:

(a) contour signal generator means responsive to said luminance signal for producing a first contour signal indicative of the contour of an image defined by at least one field, a second contour signal indicative of the contour of an image defined by at least one field, and a third contour signal indicative of the contour of an image defined by at least one field;

(b) sampling pulse generator means for producing a first sampling signal and a second sampling signal;

(c) a first moving body extractor means including:
(i) a first memory means for temporarily storing, respectively, said first and second contour signals in accordance with said first sampling signal;
(ii) a first phase compensator for compensating the phase of said third contour signal;
(iii) a first moving body contour separator means responsive to said output signal from said first phase compensator and an output signal from said first memory means for producing an output signal when a contour line represented by said output signal from said first phase compensator is out of phase with a contour line represented by said output signal from said first memory means;
(iv) a first contour line width increasing means responsive to said output signal from said first memory means for increasing the width of a contour line represented by output signals from said first memory means; and
(v) a first comparator means responsive to an output signal from said first moving body contour separator means and an output signal from said first contour line width increasing means for producing an output signal for said first moving body extractor means when a contour line represented by said output signal from said first moving body contour separator means is out of phase with a contour line represented by said output signal from said first contour line width increasing means;

(d) a second moving body extractor means including:
(i) a second memory means for temporarily storing, respectively, said first and second contour signals in accordance with said second sampling signal;
(ii) a second phase compensator for compensating the phase of said third contour signal;
(iii) a second moving body contour separator means responsive to said output signal from said second phase compensator and an output signal from said second memory means for producing an output signal when a contour line represented by said output signal from said second phase compensator is out of phase with a contour line represented by said output signal from said second memory means;
(iv) a second contour line width increasing means responsive to said output signal from said second memory means for increasing the width of a contour line represented by output signals from said second memory means; and
(v) a second comparator mens responsive to an output signal from said second moving body contour separator means and an output signal from said second contour line width increasing means for producing an output signal for said second moving body extractor means when a contour line represented by said output signal from said second moving body contour separator means is out of phase with a contour line represented by said output sinal from said second contour line width increasing means;

(e) a first position control signal generator means for calculating a moving body centroid in accordance with an output signal from said first moving body extractor means and for producing output signals representing a first horizontal position control signal and a first vertical position control signal; and (f) a second position control signal generator means for calculating a moving body centroid in accordance with an output signal from said second moving body extractor means and for producing output signals representing a second horizontal position control signal and a second vertical position control signal.

12. Moving body recognition circuit as claimed in claim 11, further comprising:
horizontal motor control means and vertical motor control means.

13. Moving body recognition circuit as claimed in claim 12, wherein said horizontal motor control means and said vertical motor control means respectively includes:

(a) switching circuit responsive to said horizontal position control signal and said vertical position control signal;

(b) pulse width determining circuit for determining the pulse width of one signal of said horizontal position control signal and said vertical position control signal such that each pulse of the other signal of said horizontal position control signal and said vertical position control signal is respectively in each pulse of said one signal of said horizontal position control signal and said vertical position control signal;

(c) inverter responsive to an output of said pulse width determining circuit; and (d) an AND gate responsive to an output signal from said inverter and said the other signal of said horizontal position control signal and said vertical position control signal.

14. Moving body recognition circuit as claimed in claim 13, wherein said switching circuit is controlled by a central processing unit.

15. Moving body tracking apparatus comprising:
(a) a TV camera for producing a TV signal having a luminance signal to image a moving body;

(b) a TV monitor for monitoring images of said moving body;
(c) a moving body recognition circuit for using said luminance signal; comprising:
  (i) contour signal generator means responsive to said luminance signal for producing a first contour signal indicative of the contour of an image defined by at least one field, a second contour signal indicative of the contour of an image defined by at least one field, and a third contour signal indicative of the contour of an image defined by at least one field;
  (ii) sampling pulse generator means for producing a first sampling signal and a second sampling signal;
  (iii) a first moving body extractor means including:
    a first memory means for temporarily storing, respectively, said first and second contour signals in accordance with said first sampling signal;
    a first phase compensator for compensating the phase of said third contour signal;
    a first moving body contour separator means responsive to an output signal from said first phase compensator and an output signal from said first memory means for producing an output signal when a contour line represented by said output signal from said first phase compensator is out of phase with a contour line represented by said output signal from said first memory means;
    a first contour line width increasing means responsive to said output signal from said first memory means for increasing the width of the contour line represented by output signals from said first memory means; and
    a first comparator means responsive to said output signal from said first moving body contour separator means and an output signal from said first contour line width increasing means for producing an output signal for the first moving body extractor means when a contour line represented by said output signal from said first moving body contour separator means is out of phase with a contour line represented by said output signal from said first contour line width increasing means;
  (iv) a second moving body extractor means including:
    a second memory means for temporarily storing, respectively, said first and second contour signals in accordance with said second sampling signal;
    a second phase compensator for compensating the phase of said third contour signal;
    a second moving body contour separator means responsive to an output signal from said second phase compensator and an output signal from said second memory means for producing an output signal when a contour line represented by said output signal from said second phase compensator is out of phase with a contour line represented by said output signal from said second memory means;
    a second contour line width increasing means responsive to said output signal from said second memory means for increasing the width of the contour line represented by the output signals from said second memory means; and
    a second comparator means responsive to said output signal from said second moving body contour separator means and an output signal from said second contour line width increasing means for producing an output signal for said second moving body extract means when a contour line represented by said output signal from said second moving body contour separator means is out of phase with a contour line represented by said output signal from said second contour line width increasing means;
  (v) a first position control signal generator means for calculating a moving body centroid in accordance with said output signal from said first moving body extractor means and for producing output signals representing a first horizontal position control signal and a first vertical position control signal; and
  (vi) a second position control signal generator means for calculating a moving body centroid in accordance with said output signal from said second moving body extractor means and for producing output signals representing a second horizontal position control signal and a second vertical position control signal;
(d) motor controller means responsive to said first and second horizontal position control signals and said first and second vertical position control signals for respectively producing a horizontal motor control signal and a vertical motor control signal; and
(e) a stand controller responsive to said horizontal motor control sinal and said vertical motor control signal for controlling movement of said TV camera.

* * * * *